Feb. 5, 1957 E. J. CLAASSEN, JR 2,780,247
VACUUM PACKING OF LOOSE CARBON BLACK
Filed May 14, 1954
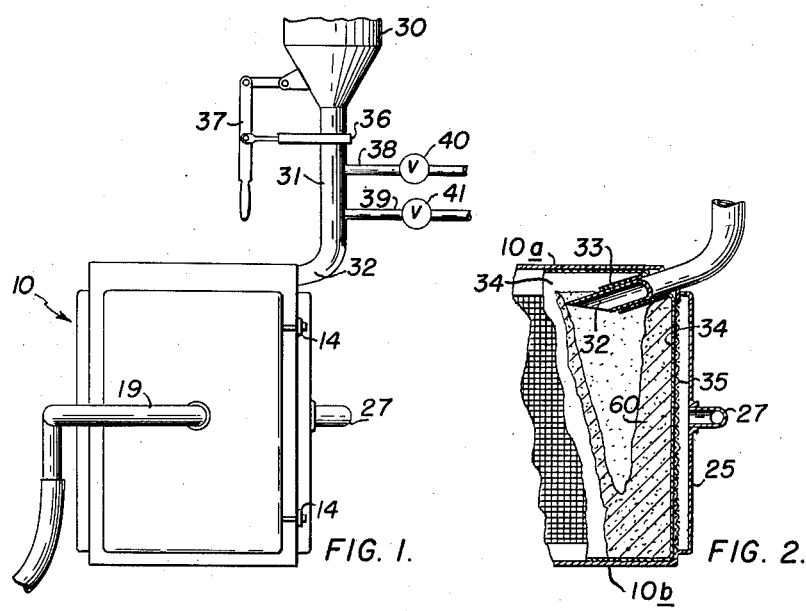
FIG. 1.
FIG. 2.
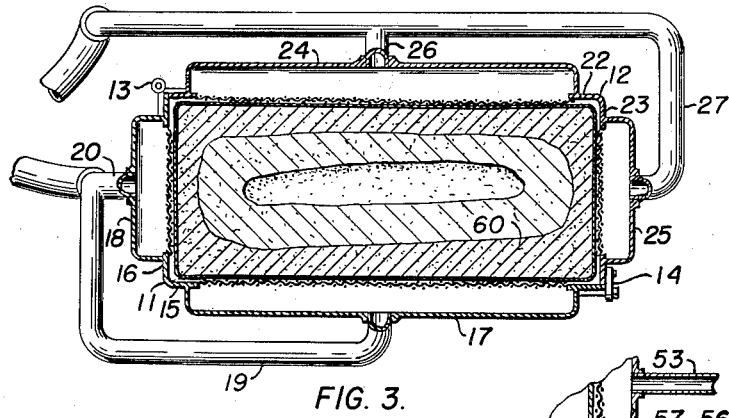
FIG. 3.
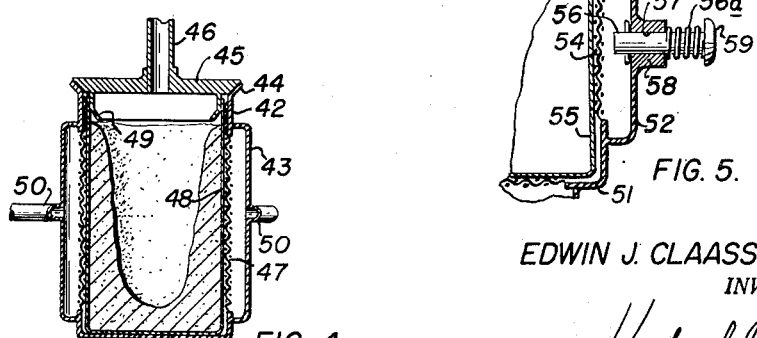
FIG. 4.
FIG. 5.
EDWIN J. CLAASSEN, JR
INVENTOR.
BY Herbert J. Brown
ATTORNEY

United States Patent Office 2,780,247
Patented Feb. 5, 1957

2,780,247

VACUUM PACKING OF LOOSE CARBON BLACK

Edwin J. Claassen, Jr., Odessa, Tex., assignor to Sid Richardson Carbon Company, Fort Worth, Tex., a corporation of Texas Application May 14, 1954, Serial No. 429,819

6 Claims. (Cl. 141—7)

This invention relates to improvements in the packing of finely divided solids, such as loose carbon black, and has particular reference to methods of packing the finely divided solids.

In nearly all of its uses carbon black is incorporated into other materials to impart such properties as high electrical conductivity, controlled viscosity and strength, a black color, and high covering power. In all of these uses it is important to thoroughly disperse the carbon black in the carrier material so that optimum properties and best use of the carbon black can be obtained. Carbon black for these uses is usually purchased in bags at approximate bulk densities of 10 to 18 lb./cu. ft. The density of carbon black as manufactured is one to five lb./cu. ft., and is much too light to economically ship from the manufacturer to the consumer. It is the usual practice to agitate the loose black to increase its bulk density and then screw pack the agitated black into shipping bags at the 10 to 18 lb./cu. ft. density.

Agitation of carbon black is usually accomplished by placing the carbon black in a tank and subjecting the carbon black to the beating action of rods attached to a rotating shaft. The beating action drives the carbon particles closer together and simultaneously drives out a portion of the entrained gases, thus increasing the density of the carbon black. When the desired density has been reached, the carbon black is drawn from the agitator tank by vertical screw conveyors which press the carbon black downward into shipping bags. It is also possible to densify carbon black by other means, such as compression and pelletization.

In all of the above methods of densification, the carbon black is subjected to mechanical force which, while densifying the carbon black, also forms various amounts of agglomerates. Agglomerates are defined as aggregates of individual carbon black particles which have been formed by molecular attraction into clusters of individual particles, the size of which can vary from pea-size down to submicroscopic. No definite standards have been established, but the industry recognizes agglomerates as being of varying strengths, namely, soft, medium and hard. The cohesive forces binding together the individual particles within the agglomerate vary in strength from very weak to very strong, depending upon the amount and intensity of the force previously applied to the agglomerate either at a single time or in increments. When carbon black is dispersed in a carrier medium, the carbon black agglomerate is broken down only if the applied dispersing force is greater than the cohesive force of the agglomerate. The strength of some agglomerates is so great that they are never completely broken down by conventional dispersing methods. The greater the number of medium strength and high strength agglomerates, the more time consuming and more costly is the dispersion process. It is obvious, therefore, that a densified carbon black which contains a lesser number of medium strength and high strength agglomerates and which will, consequently, disperse more readily in the carrier medium is a new and novel product. It will save processing cost, save processing time, and give a product with better properties.

An object of the invention is to provide means for densely packing finely divided solids in porous bags or the like for saving space when shipping and storing the packed product, for giving ease of handling, and for producing a less dusty product.

Another object of the invention is to provide means for densely packing loose carbon black in porous bags or the like.

A particular object of the invention is to pack loose carbon black as a product which is more free of tightly bonded agglomerates than other comparable grades of carbon black of comparable density.

A further object of the invention is to rapidly pack finely divided substances, such as loose carbon black, in porous bags or the like.

The present invention is particularly directed to methods and apparatus for the vacuum packing of loose carbon black by means of subjecting the outer surface of the packing bag to a vacuum and at the same time filling the bag through an opening therein, such as a sack sleeve or the mouth of the sack. Finely divided solids form a densified layer on the inner surface of the bag during the first part of the packing operation, and which densified layer forms a seal which retards the passage of the gas which is carrying the finely divided solids and retards the packing operation. The densified black has a cellular-like structure. Pieces as large as 6" by 6" by 2" thick can often be held by hand at the edges, and still have the piece retain its shape and rigidity. Yet the pieces can easily be powdered and crumbled by pressure of the fingers. It is an object of the invention to establish a vacuum within the bag behind the densified layer, which can be done by breaking the densified layer during the filling of the bag, or which can be done by applying a vacuum at the opening through which the bag is filled with the finely divided solids.

A problem in connection with the packing of carbon black has to do with the presence of agglomerates caused by certain mechanical handling equipment, such as agitators and paddles. In the present invention the loose carbon black is not subjected to mechanical force while it is being densified, thus in large measure avoiding dense, high strength agglomerates with improvement in the product. Mechanical force is herein defined as force applied directly to the object under consideration by a solid surface.

Other objects and uses of the invention will become apparent to those skilled in the art by reference to the following description and the accompanying drawings, wherein:

Figure 1 is a front elevation of vacuum packing apparatus embodying the features of the invention.

Figure 2 is a broken elevation and sectional view of a portion of the apparatus shown in Figure 1 and illustrating a preferred delivery means for filling a porous bag.

Figure 3 is a top plan and sectional view of the shroud or housing construction, and additionally shown densified layers of carbon black within the packing bag caused by the vacuum operation.

Figure 4 is a vertical sectional view of a modified form of the invention wherein the bag to be packed is of the open end type.

Figure 5 is a broken vertical sectional view of a further modified form of the invention wherein mechanical means are employed for breaking the densified layers above referred to.

The form of the invention shown in Figures 1 through 3 includes a rectangular housing or shroud 10 having front and back members 11 and 12. The members 11 and 12 are pivotally connected with each other by means of hinges 13 connecting adjoining vertical edges thereof. Latches 14 detachably secure the vertical edges of the members 11 and 12 opposite the hinges 13, and top and bottom members 10a and 10b are secured to the front member 11. The front and end walls 15 and 16 of the front member 11 are provided with outwardly projecting enlargements or chambers 17 and 18, and which chambers are connected with each other by connecting vacuum lines 19 and 20; the joined lines 19 and 20 are, in turn, connected with a flexible hose extending to a source of vacuum, not shown. Similarly, the back and end 22 and 23 of the back member 12 are provided with communicating chambers 24 and 25 which are respectively connected with joined vacuum lines 26 and 27, and which lines are connected with the vacuum source.

Above the shroud 10 there is a hopper 30 containing the loose carbon black to be packed. A descending duct 31 connects the hopper 30 with a delivery spout 32 in an upper corner of the rear shroud member 12, and which spout is angularly disposed and arranged to be positioned through the sack sleeve or valve 33 of a paper packing bag 34. The bag 34 is received within an openwork or mesh basket 35 having inside dimensions substantially equal to or slightly less than the outside dimensions of the bag. The basket may be made in a shape to produce a rectangular, elliptical, or other desired form in the bag. The basket 35 is opened integrally with the shroud for receiving the bag 34. A carbon black valve 36 is provided in the duct 31 and is operated by a valve handle 37 mounted on the hopper 30. A vacuum line 38 and an air pressure line 39 are connected with the delivery duct 31 between the carbon black valve 36 and the delivery spout 32. The last referred to lines 38 and 39 are respectively provided with valves 40 and 41.

The form of the invention shown in Figure 4 includes a housing or shroud in the form of a box like structure 42 having an open upper end, together with communicating outwardly projecting vacuum chambers 43 on the sides thereof. The upper end of the shroud 42 is outwardly flanged, as at 44, and receives the beveled edges of a removable head 45. A delivery duct 46 extends through the head 45, and which duct communicates with a source of loose carbon black, such as the described hopper 30. Also, the duct 46 may be provided with the described carbon black valve 36 and the vacuum line 38 and valve 40, and the air pressure line 39 and valve 41. A basket 47 is positioned within the shroud 42, and which basket receives a paper packing bag 48. The upper end of the open mouth bag 48 is held against the upper inner surface of the basket 47 by means of spring flanges 49 descending from the lower surface of the head 45. Vacuum lines 50 are connected with vacuum chambers on the shroud 42.

The form of the invention shown in Figure 5 is an example for mechanically breaking and rendering pervious the densified layers of carbon black, and which modified form of the invention includes a shroud 51, an outwardly projecting vacuum chamber 52 communicating therewith, a vacuum line 53 connected with the vacuum chamber, a basket 54 received within the shroud, and a paper bag 55 received within the basket. While only a portion of the device is shown, it is to be understood that the shroud 51, basket 54 and bag 55 may be rectangular, elliptical, or any desired shape in lateral cross section, as before. Also, there is preferably a separate vacuum chamber 52 for each side of the shroud 51. The chambers 52 are provided with cylindrical mechanical jolters 56 slidably disposed through openings 57. Slip fit collars 58 are secured to the outer surface of the chambers 52 and provide seals for the longitudinally slidable agitators 56. The outer end of each jolter 56 is provided with a head 59, activated by any convenient source of intermittent power, and a coiled compression spring 56a is positioned around each jolter between its respective collar 58 and the head thereof.

In operation, the packing of loose carbon black in bags 34 by means of the apparatus shown in Figures 1 through 3, may be carried out in several different ways within the scope of the invention. The preferred method is to position the bag 34 in the basket 34, and the shroud 10 is closed after the delivery spout 32 is in place within the bag sleeve 33. The carbon black valve 36 is then opened. A vacuum is applied to the outer surface of the bag 34 by means of the vacuum lines 26, 27, 19 and 20. Carbon black is sucked from the hopper 30 through the delivery spout 32. By reason of the vacuum, a first densified layer of carbon black 60 forms over the inner surface of the bag 34, and whch densified layer soon reduces the effect of the vacuum. Carbon black valve 36 is then closed, and air pressure through line 39 is applied momentarily to the interior of the bag 34 to compact or densify the loose carbon black against the inner surface of the densified layer 60. The valve 40 in the vacuum line 38 connected with the delivery duct 31 is then opened, a reduced pressure is applied to the inside of the bag 34, and the valve closed. The operation is then repeated until the bag 34 is substantially filled with the product, the vacuum applied to the outer surface of the bag 34 being maintained throughout the filling operation.

The bag may also be filled with carbon black by the procedure given in the preceding paragraph, except that vacuum is first applied to the outer surface of the bag 34 by means of the vacuum lines 26, 27, 19 and 20, then the carbon black valve 36 is opened. It is also possible to fill the bag by the procedure given in the preceding paragraph except that, instead of reestablishing the vacuum inside of bag 34 through line 38, the pressure inside bag 34 is allowed to dissipate through the densified layer into the vacuum chambers 17, 18, 24, and 25.

Another method of packing the bag 34 with the apparatus described in connection with Figures 1 through 3 eliminates the use of the vacuum line 38 connected with the delivery duct 31. By relieving the vacuum in chambers 17, 18, 24 and 25, after the densified layer of carbon black 60 builds up within the sack 34, it has been found that the bag 34 will partially collapse and the thus packed product will form crevices, allowing reapplication of the vacuum to additional quantities of the same delivered from the hopper 30. However, this operation is somewhat slower than the one first described. A fifth mode of operation is by closing the carbon black valve and allowing the pressure inside the bag 34 to approach the low pressure in the vacuum chambers 17, 18, 24 and 25. This last mode of operation may be speeded by means of mechanical jolting such as described in connection with Figure 5.

A valve-type paper bag made of two or three plies of 50 lb. kraft paper is the preferred packing bag. The valve sleeve is made of 50 lb. kraft and is pasted at the inner end to the tube of the bag. These bags are in common use for the packing of pelletized carbon black. Bags with more and less plies have been used without affecting the quality of the packed carbon black. It is economically advantageous to use as few plies as possible, but less than three plies tends to give excessive bag breakage during the packing operation. An open-mouth, SOS bag of three-ply 50 lb. kraft paper has also been used by changing the method of sealing the opening into the sack. The bag must be one which is easily permeable to the flow of the gas which is carrying the finely divided solids, but which will also filter out the material being carried by the gas stream. No other limitation is placed on the type of material from which the bag is made, except that the bag must be strong enough not to break under the conditions used in the packing operation.

Using valve-type bags of three plies of 50 lb. kraft paper, bags were filled as shown in the following illustrations:

Illustration No. 1

Open carbon black valve 36 and then apply vacuum to the outer surface of bag 34 for 20 seconds. Close carbon black valve. Vacuum inside sack went to 16" Hg in 3 sec.

Open valve 36 two seconds for "shot" No. 1, close valve 36, vacuum inside densified layer went to 16" Hg in 37 sec.

Repeat for "shot" No. 2, vacuum to 14" Hg in 58 sec.
Repeat for "shot" No. 3, vacuum to 8" Hg in 214 sec.
Repeat for "shot" No. 4. (The filling operation normally terminates here, but the vacuum rise was checked, and went to 3" Hg in 310 seconds.)

Throughout the run approximately 23" Hg vacuum was maintained in chambers 17, 18, 24 and 25. The bag was packed throughout, but the time required to pack the bag was long since the layer of densified black was not broken, nor was the air inside of the bag sucked out through line 38.

Illustration No. 2

Fill bag for 20 seconds as in Illustration No. 1.
Open valve 36 for 2 seconds for "shot" No. 1, close valve 36, apply air pressure at approximately 30 p. s. i. for one second through air pressure line 39, close valve 41, vacuum inside densified layer went to 16 Hg in 26 seconds.

Repeat for "shot" No. 2, vacuum to 16" in 20 seconds.
Repeat for "shot" No. 3, vacuum to 16" in 18 seconds.
Repeat for "shot" No. 4. (The filling operation normally terminates here, but the vacuum rise was checked, and went to 16" Hg in 28 seconds.)

Throughout the run approximately 23" Hg vacuum was maintained in chambers 17, 18, 24 and 25. The bag was packed throughout. The length of time required to pack the bag was much less than that required in Illustration No. 1. The densified layer of black was broken by applying air pressure inside of the sack each time the densified layer built up so much resistance to the flow of air that carbon black was no longer being sucked into the sack with sufficient velocity to densify it.

Illustration No. 3

Fill bag for 20 seconds, as in Illustration No. 1.
Open valve 36 for 2 seconds for "shot" No. 1, close valve 36, apply air pressure at approximately 30 p. s. i. for 1 second through air pressure line 39, close valve 41, open valve 40, which is connected to a source having 23" Hg vacuum, allowing the vacuum inside the densified layer to go to 16" Hg in 11 seconds.

Repeat for "shot" No. 2, vacuum to 16" Hg in 17 seconds.

Repeat for "shot" No. 3, vacuum to 16" Hg in 11 seconds.

Repeat for "shot" No. 4. (The filling operation normally terminates here but the vacuum rise was checked, and went to 16" Hg in 10 seconds.)

Throughout the run approximately 23" Hg vacuum was maintained in chambers 17, 18, 24 and 25. The bag was packed throughout.

In each of the above illustrations the carbon black was packed to a final density of 14 lb./cu. ft., plus or minus 0.5 lb./cu. ft. After "shot" No. 1, for each illustration, the bag was packed approximately 30% with densified carbon black, the remaining volume of the bag being filled with loose, fluffy black. The bag was filled approximately 60% with densified black after "shot" No. 2, 85% after "shot" No. 3, and 95–100% after "shot" No. 4. The loose carbon black in hopper 30 weighs two to six pounds per cubic foot, carbon black packed in accordance with the invention weighs 10 to 21 pounds per cubic foot, depending on the conditions and method used to fill the bag.

The superior properties of the vacuum packed carbon black can be shown by the properties which this carbon black imparts to an ink, as compared to standard commercial ink carbon blacks. The inks described in the following illustrations were made by milling the carbon black into oil on a three-roll laboratory ink mill with a moderately wide mill setting.

Illustration No. 4

An ink containing 12% by weight carbon black in mineral oil was made at a mill clearance of 0.0020".

| Carbon Black | Viscosity, Centipoise | Residue, Percent |
|---|---|---|
| Commercial Ink Black No. 1 | 5,500 | 0.146 |
| Commercial Ink Black No. 1 | 7,500 | 0.208 |
| Commercial Ink Black No. 2 | 13,200 | 0.063 |
| Vacuum Packed Ink Black | 22,700 | 0.031 |

The residue test is made by mixing 80 g. of the ink in approximately 1 pint of gasoline, pouring the resulting mixture through a 200 mesh screen, and washing the residue with additional gasoline. The residue is reported as percentage of carbon black which will not pass through the 200 mesh screen. A high residue shows the presence of high strength agglomerates which are so strong they cannot be broken down by the dispersing force, and so large that they will not pass through the 200 mesh screen. A low viscosity shows that agglomerates which are smaller than 200 mesh are still not fully dispersed. The better the dispersion of the carbon black in the oil, the higher is the viscosity, i. e., the stiffer is the ink and the better its covering power. An ink with high viscosity and low residue, consequently, is a better ink.

Illustration No. 5

An ink containing 8.25% by weight carbon black in mineral oil was made with a mill clearance of 0.0020" on the front roll and 0.0015" on the back roll.

| Carbon Black | Viscosity, Centipoise | Residue, Percent |
|---|---|---|
| Commercial Ink Black No. 1 | 8,200 | 0.061 |
| Vacuum Packed Ink Black | 23,900 | 0.030 |

Illustration No. 6

An ink containing 10% by weight carbon black in mineral oil was made with a laboratory size colloid mill. Viscosities and screen residues are given for various mill openings. It is to be noted that the carbon blacks have varying densities, and that viscosity decreases while residue increases with an increase in density.

| Carbon Black | Carbon Black Density, lb./cu. ft. | Viscosity at Specified Mill Openings | | | |
|---|---|---|---|---|---|
| | | 0.005" | 0.010" | 0.015" | 0.020" |
| Charge Stock for Vacuum Pack | 5 | 32,300 | 33,300 | 31,800 | 30,400 |
| Commercial Black No. 1 | 10 | 31,400 | 30,000 | 28,600 | 27,200 |
| Commercial Black No. 2 | 11 | 31,200 | 26,400 | 21,600 | 16,800 |
| Commercial Black No. 3 | 11 | 29,000 | 26,800 | 24,700 | 22,500 |
| Commercial Black No. 4 | 12 | 27,300 | 22,400 | 17,400 | 12,500 |
| Commercial Black No. 5 | 12 | 24,100 | 19,300 | 14,500 | 9,700 |
| Vacuum Pack No. 1 | 12.3 | 32,400 | 31,000 | 29,700 | 28,300 |
| Vacuum Pack No. 2 | 14.3 | 31,000 | 29,000 | 26,900 | 24,800 |

| Carbon Black | Carbon Black Density, lb./cu. ft. | Screen Residue at Specified Mill Openings | | |
|---|---|---|---|---|
| | | 0.005″ | 0.010″ | 0.015″ |
| Charge Stock for Vacuum Pack | 5 | 0.012 | 0.038 | 0.075 |
| Commercial Black No. 1 | 10 | 0.031 | 0.038 | 0.050 |
| Commercial Black No. 2 | 11 | 0.019 | 0.063 | 0.200 |
| Commercial Black No. 3 | 11 | 0.031 | 0.063 | 0.210 |
| Commercial Black No. 4 | 12 | 0.038 | 0.113 | 1.00 |
| Commercial Black No. 5 | 12 | 0.025 | 0.088 | 0.75 |
| Vacuum Pack No. 1 | 12.3 | 0.038 | 0.063 | 0.12 |
| Vacuum Pack No. 2 | 14.3 | 0.038 | 0.088 | 0.30 |

The product resulting from any of the described modes of operation is a densely packed carbon black having substantially less agglomerates which are difficult to disperse than comparable commercial grades of ink black packed to a comparable density. The product of the invention is particularly desirable as a colorant.

I claim:

1. A process of increasing the apparent density of loose bulk compressible material having low apparent density, which comprises introducing said material together with a large quantity of gas into a container having a permeable wall, the pores of which permit passage of gas therethrough but not said compressible material, applying a pressure differential to the interior and exterior of the container, which is less at the exterior than at the interior, whereby the gas is removed from the bulk material and the material within the container is compressed against the interior of the container and is densified without substantial agglomeration to form a substantially impervious layer, thereafter discontinuing the introduction of material into the container, establishing a vacuum within the container, and introducing additional material into the container under vacuum.

2. A process as set forth in claim 1, in which the step of applying differential pressure is carried out prior to initially admitting the loose bulk material to the container.

3. A process as set forth in claim 1, in which the step of applying differential pressure is carried out simultaneously with the admission of loose bulk material to the container.

4. A process as set forth in claim 1, which includes the step of partially collapsing the container after the formation of the initial impervious layer to break said impervious layer and thereby permit application of vacuum to said container from the exterior thereof.

5. A process as set forth in claim 1, which includes the step of breaking the initial densified layer by the application of external mechanical force to permit application of vacuum to the interior of said container from the exterior thereof.

6. A process as set forth in claim 1, which includes the steps of initially introducing the compressible material into the container with application of vacuum around the container, then stopping the flow of material while maintaining reduced pressure around the container, momentarily applying positive pressure to the inside of the container, reestablishing a reduced pressure inside the container by applying vacuum inside the container internally of the densified layer, and thereafter admitting additional portions of said material into said bag.

References Cited in the file of this patent

UNITED STATES PATENTS

| | | |
|---|---|---|
| 980,949 | Heybach | Jan. 10, 1911 |
| 1,782,733 | Lilly | Nov. 25, 1930 |
| 2,134,950 | Offutt | Nov. 1, 1938 |
| 2,415,072 | Brown | Feb. 4, 1947 |
| 2,452,935 | Kemp | Nov. 2, 1948 |
| 2,565,045 | Ray | Aug. 21, 1951 |

FOREIGN PATENTS

| | | |
|---|---|---|
| 48,984 | Austria | Apr. 15, 1910 |